(No Model.) 4 Sheets—Sheet 1.
C. COLAHAN.
GRAIN BINDER.
No. 304,077. Patented Aug. 26, 1884.
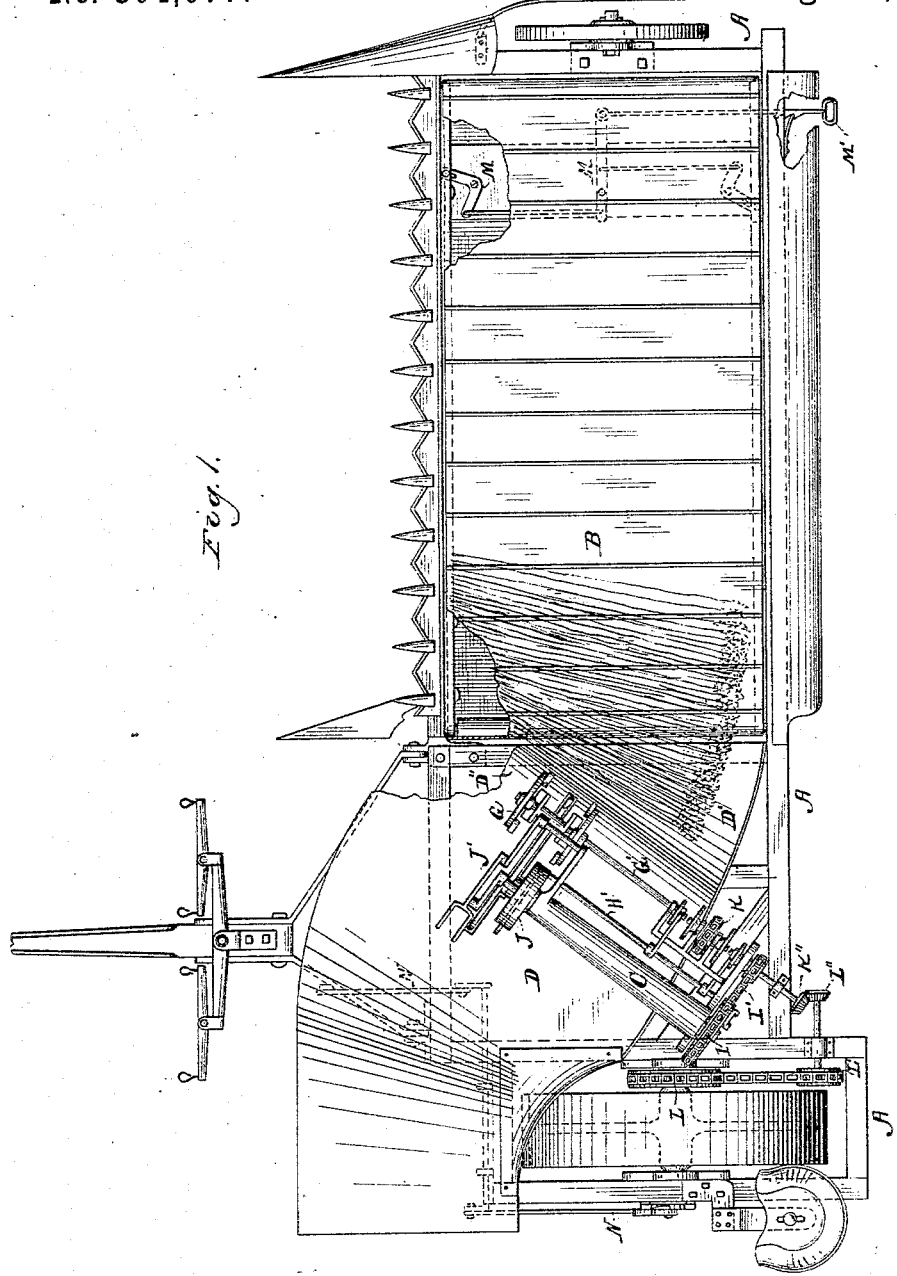
Witnesses.
Inventor.

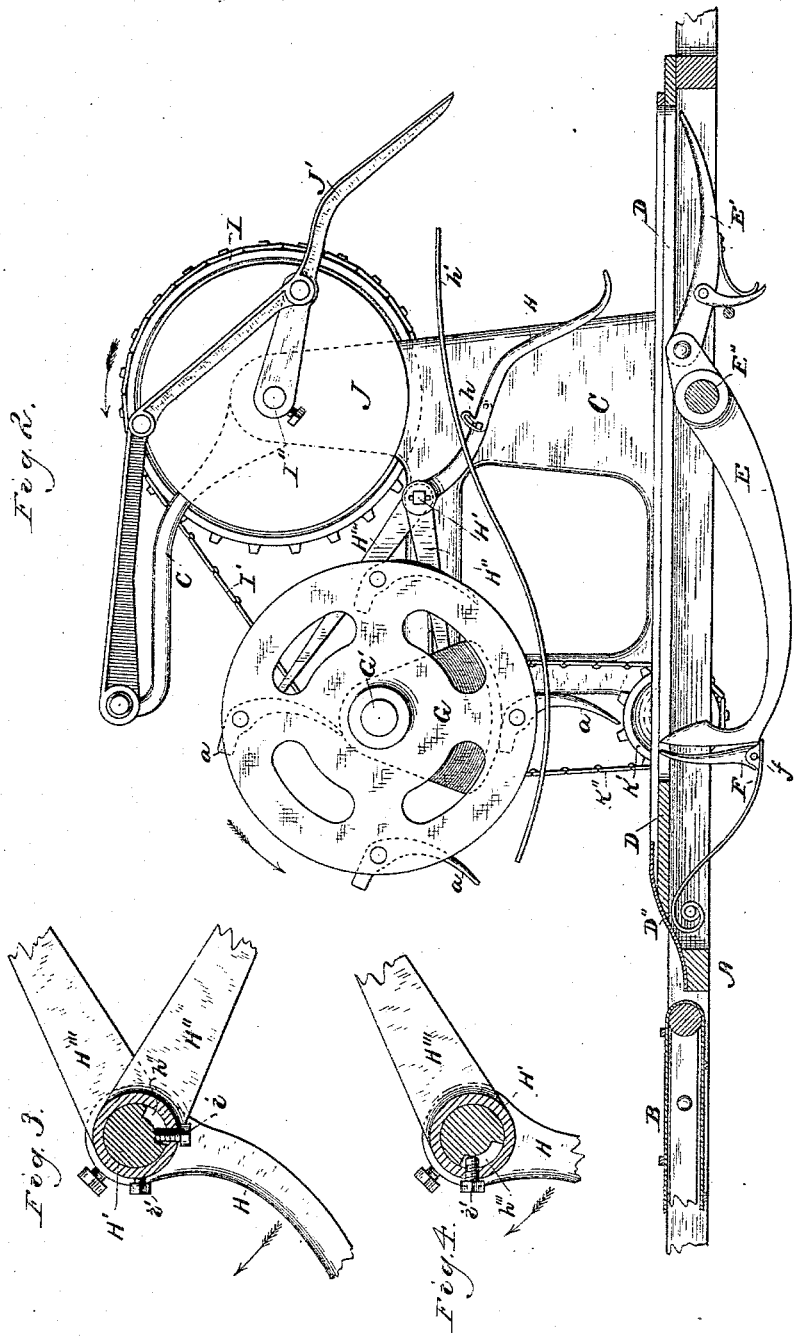

(No Model.)  
4 Sheets—Sheet 3.

C. COLAHAN.
GRAIN BINDER.

No. 304,077.  
Patented Aug. 26, 1884.

Witnesses.  
Inventor.  
Chas. Colahan (No Model.)
4 Sheets—Sheet 4.
C. COLAHAN.
GRAIN BINDER.
No. 304,077. Patented Aug. 26, 1884.
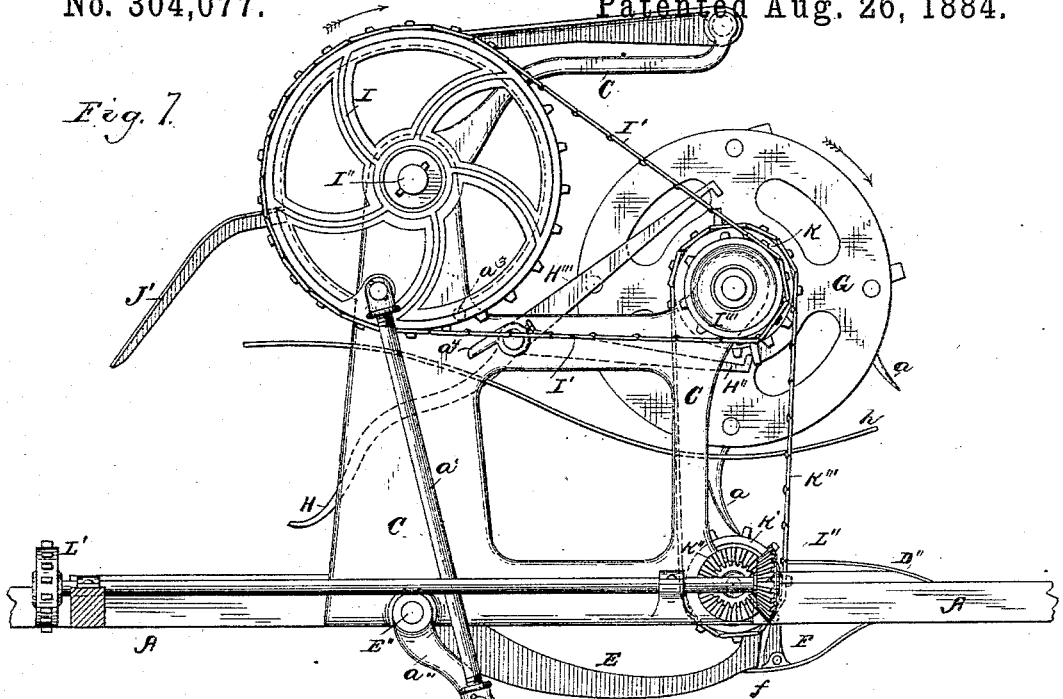
Fig. 7.
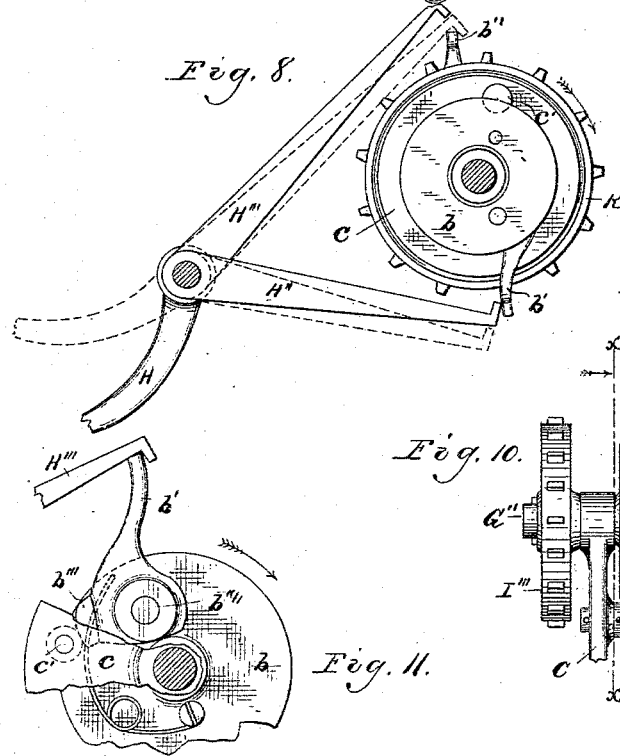
Fig. 8.
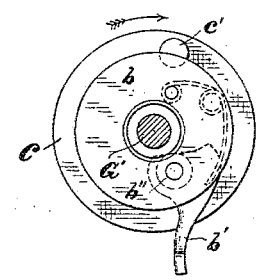
Fig. 9.
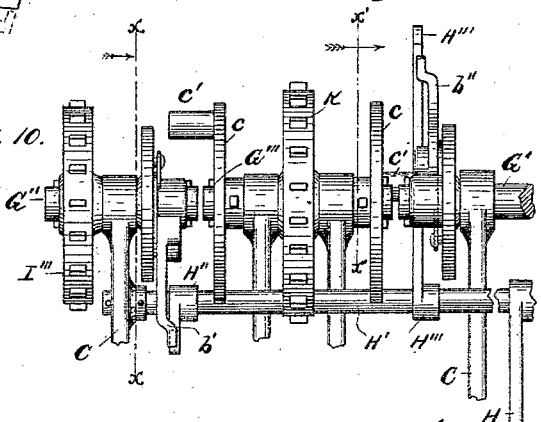
Fig. 10.
Fig. 11.
Witnesses,
Inventor.
Chas. Colahan

UNITED STATES PATENT OFFICE.

CHARLES COLAHAN, OF CLEVELAND, OHIO.

GRAIN-BINDER.

SPECIFICATION forming part of Letters Patent No. 304,077, dated August 26, 1884.

Application filed January 7, 1884. (No model.)

*To all whom it may concern:*

Be it known that I, CHARLES COLAHAN, of Cleveland, county of Cuyahoga, and State of Ohio, have invented certain new and useful Improvements in Grain-Harvesting and Binding-Machines, of which the following is a specification.

My invention relates partly to the harvester in its manner of delivery of the cut grain to the binding-table in order to secure a well-balanced one-wheel machine, with grain-wheel in connection with the proper-delivery of the cut grain to the binder, and the location of the binder and its packing mechanism at a desirable oblique angle to the line of cut, to aid in the gathering and discharge of the sheaf in the front or rear of the main drive-wheel, the latter feature or rear delivery being a modification of the present invention and will be the subject of a division of this application; also, in the novel construction of the binder, in the simplicity of its packing and tripping devices to secure the stopping and starting of the same in the process of securing and binding the bundle, and in the various combinations and arrangements or details of construction hereinafter described and claimed.

Figure 5:
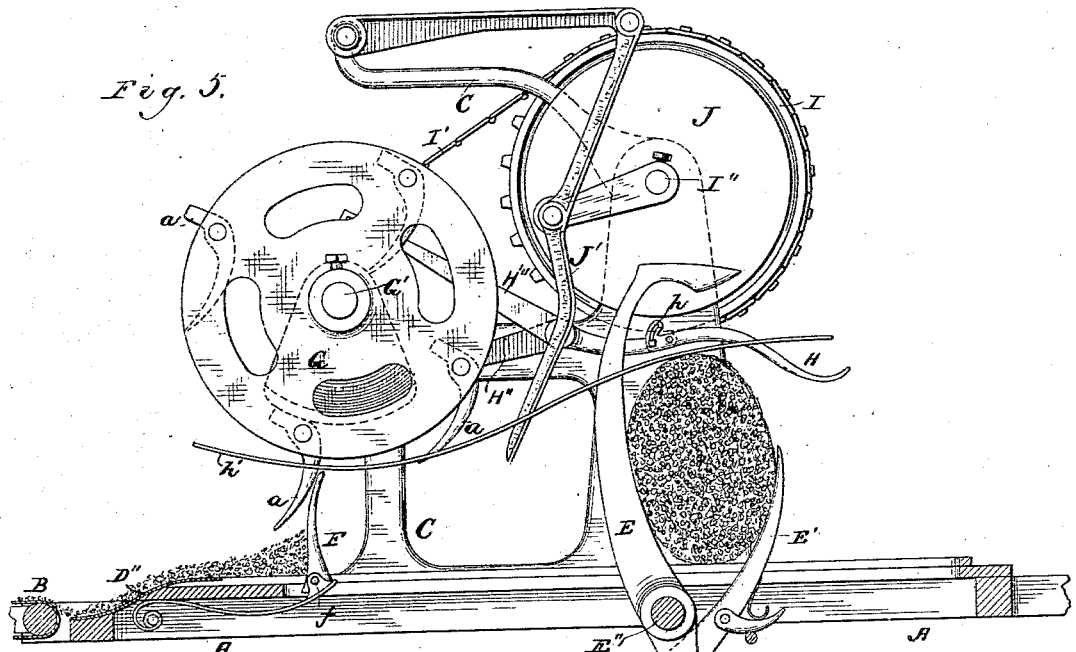
Figure 6:
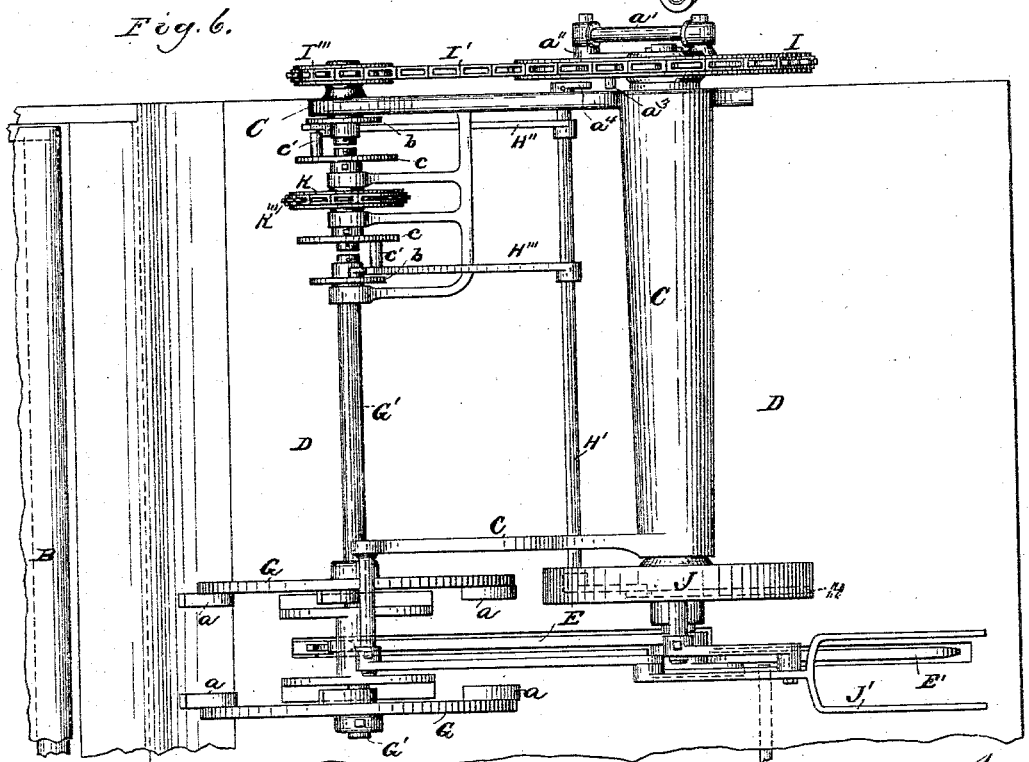

In the drawings, Figure 1 represents a top view of the harvester and binder embodying my invention. Fig. 2 is an end sectional view of the binder and the receiving-platform, and also a part of the harvester carrying-apron. Figs. 3 and 4 are sectional views of the tripping-arm, its shaft, and the arms that alternately retain and release the clutch-pawls; also, showing the slot in the shaft and the pin which admits of the partial rotation of the shaft without causing movement to the pawl-retaining arms. Fig. 5 is an end sectional view showing the formation of the sheaf as the binder-arm has gathered the same from the table and closed its compressor, and the revolving packing device is at rest while the pivoted rocking cut-off finger which rises with the binder-arm stops the flow of the incoming grain delivered by the continuously-traveling harvester-apron. Fig. 6 is a view of the binder placed parallel to the carrier-apron. This figure is a top view of the binder. Fig. 7 is a rear end view of the binder and the manner of communicating motion thereto from the harvester; also, the actuating parts of the binder, as shown in Fig. 6. Fig. 8 is an end sectional view of the continuously-running sprocket-wheel and the pawl-carrying plate that gives motion to the binder-actuating shaft; also, showing the pawl-retaining arms in position when the binder is at rest, while the pawl actuating the revolving packer-shaft on the opposite side is free to carry or revolve the same. Fig. 9 is a sectional view showing the plate secured to the continuously-revolving shaft carrying the ratchet-pin that actuates the connecting-pawl on the plate contiguous thereto when brought in connection with the pawl thereon. Fig. 10 shows in detail the continuously-revolving sprocket-wheel and its supporting arms or bearings on each side thereof, and the shaft extending through the same, carrying on each end the plate and its ratchet-pin, while on each side are the packer and binder shafts and the plates secured thereto carrying the pawls, respectively, and the supporting-arms in which said shafts revolve are at each end of said shafts located on the inner side of said pawl-carrying plates. Fig. 11 represents the pawl on its revolving plate when the retaining-arm has forced it back against its retaining-spring, that the ratchet-pin may pass by in its continual revolution, and not be brought in contact therewith, except at required intervals, as hereinafter described.

By thus referring to the drawings the accompanying description may be readily understood, so as to enable one acquainted in the art to construct and operate the machine.

The purpose of my invention, as shown in this application, is to secure a perfect operation of the automatic grain-binder at the delivery-point of the harvesting-machine in connection with what is known as the "one-wheeled machine," which, for many obvious reasons, is considered the most desirable form of construction for general use, it being so balanced upon the main supporting driving-axle as to secure the entire power and weight for driving the machinery by the main wheel, and the facility for tilting the cutting apparatus when required in short or lodged grain.

It is a well-known fact that the grain in the process of raking in an ordinary harvesting-machine with an endless-carrier will be advanced or carried to the delivery end of the carrier with the heads in advance of the butts, and the state of the art will show many devices invented to overcome this objectionable feature in the usual adaptation of the binder to operate in connection therewith. In my present invention I find great advantage in locating the binder oblique to the line of cut or movement of the platform-carrier, to receive the grain as it is naturally delivered, and to bind the same in its direct movement, and which enables me to discharge the bound sheaf on the ground without passing it over the main wheel.

I employ the usual form of harvester-cutting apparatus; and my invention consists in the several novel devices and combinations herein shown.

Similar letters of reference denote the same parts in the several figures.

In Fig. 1, A represents the main harvester-frame.

B is the endless carrier-apron.

C are the standards supporting the main binder-gearing, which is of the usual form, and cast in one piece.

D is the table upon which the grain is delivered from the endless carrier. This table is located at a point between the carrier and binder-table, constructed concave at the point where the grain is received from the harvester-carrier, and at the rear end, D', (see Fig. 1,) or where the heads of the grain are delivered, is much wider and deeper at this point than in the front, to facilitate the advance of the heads, while at the butts the gaveler and packer will gather and rapidly compress the loose bulky straw when it is presented to the grain-binder in proper shape for the formation of the sheaf. The binder-table is extended around and in front of the main axle of the drive-wheel, and the binding mechanism is supported and secured on the opposite side of the axle, while the driver's seat is also arranged to aid to perfectly balance the entire machine on the main axle, thus relieving the pole or tongue of weight and enabling the driver to easily operate the tilting-lever and adjust the cutters to any desired angle.

E is the binder or cord-carrying arm with its compressor E' attached thereto; E'', its actuating-shaft.

F is a cut-off or stopping-finger, which is pivoted to a spring at $f$, and operated to stop the flow of grain during the operation of binding a bundle. Its function is to keep the space open and free from inflowing grain for an instant, and under the pressure of the inflowing grain it will rock forward on its pivot as the grain accumulates, to enlarge the capacity of the table at that point, while the binder-arm advances, and it is rocked backward on its pivot forcing the grain back as the binder-arm on its return movement comes in contact with its outer end and returns to its normal position. The pivot admits of the flexible movements desirable to make the cut-off finger conform to the outer line of travel of the binder-arm.

G G are packer-disks for supporting the falling fingers $a\ a$, which aid in gathering in the desired quantity of grain as the disks are revolved by the shaft G'.

H is the tripping-arm, which is secured to its rock-shaft H'. Said tripping-arm is made adjustable by means of a slot therein, as shown at $h$.

H'' is a binder-mechanism stop-lever, which is actuated by the rock-shaft H', and, when it is brought in contact with the pawl $b'$, will cause the same to rock on its pivot where it is secured to the plate $b$, and prevent it from clutching the ratchet-pin $c'$, which is secured to the continuously-revolving plate $c$.

H''' is the stop-lever, which operates in the same manner to stop and start the packer-shaft G'.

G'' is the shaft that imparts motion to the binder mechanism, as shown in Figs. 3, 4, 8, 10, and 11. The screw-pins $i\ i'$, passing through the hubs of stop arms or levers H'' H''' into a slot in shaft H', admit of the partial rotation or adjustment of the rock-shaft.

I is the sprocket chain-wheel, which is revolved by the movement of the chain I', which passes over the sprocket-wheel I''', which is secured to the shaft G'', and serves to impart the desired movement to the grain-binder shaft I''.

J is the cam-wheel actuating the cord-securing device.

J' is the bundle-discharging device.

$k$ is the continuously-revolving sprocket-wheel that alternately imparts motion to the binder and packing mechanism.

$k'$ is the sprocket-wheel, which imparts motion to the chain $k'''$.

$k''$ is the bevel-gear actuating the same, which receives its motion through the medium of the main drive-wheel L and its connection L' L''.

$a'\ a''$ is the binder-arm, pitman, and crank.

$a^3$ is a pin projecting from the sprocket-wheel I.

$a^4$ is an adjustable pawl secured to the rock-shaft H', the object of which is to cause the tripping-arm to assume its normal position over the binder-table preparatory to the gathering and packing of a predetermined quantity of grain for a bundle.

M M' is a device for adjusting the endless carrier, and is more clearly described and shown in my former Patent No. 285,464, September 25, 1883.

N is the lever by means of which the driver is enabled to tilt the machine, as required in cutting grain of different heights, as with this form and construction of machine no other raising and lowering device is needed.

It will thus be clearly understood that in its operation as the machine advances through the standing grain the cutting apparatus will sever the same, which, falling upon the endless carrier, will be conveyed to the binder-table, as described, when the revolving packer-teeth $a$ will gather and pack the same upon the table against the tripping-arm H, which will yield until it will cause rock-shaft H' to rock and depress the stop-lever H'' from contact with the pawl $b'$, when said pawl will come in contact with the ratchet-pin $c'$, and cause the sprocket-wheel I''', which is secured to the shaft G'', to set the binder in operation, and when the rock-shaft has caused the binder stop-lever H'' to move away from contact with its pawl $b'$, said shaft will cause a simultaneous movement of the stop-arm H''', which will bring it in contact with the pawl $b''$, thereby releasing or unclutching the packer-shaft G', which will remain at rest during the process of binding, and the binder-arm E and the accompanying cut-off finger F will rise through the grain upon the table, the binder-arm advancing forward, and, in connection with the compressor E', will form a compact solid bundle, the band of which will be secured by the cord-tying apparatus, which is located above and actuated by the cam-wheel J, when the binder-arm, with its compressor and the cut-off, will recede to the normal position, and the discharging-arm J' will displace the bundle, and the revolving wheel I and its pin $a^3$ will come in contact with the pivoted pawl $a^4$ and cause the rock-shaft H' to simultaneously depress the arms H''' H'', thus releasing the binder-pawl $b'$ from its clutching-pin and causing the connection to be made with the packer, as clearly shown in Fig. 8.

Having thus shown and described my invention, what I claim, and desire to obtain by Letters Patent, is—

1. The combination of the harvester-carrier apron and the binder-table, extending around and in front of the main axle, with the supports for the binder mechanism, located in the rear of the main axle at an angle thereto, to gather the inflowing grain and bind the same in bundles, substantially as shown and described.

2. The combination of the main wheel L, the endless carrier B, the binder-table extended around in front of the main drive-wheel, and the grain-binder mechanism supported and arranged over the binder-table in an angular position, whereby the machine is properly balanced on said wheel and the bundle is received and discharged around and in front of the main axle, in a manner substantially as shown and described.

3. The combination of the packer and binder-operating shafts of the tripping-arm H, with its rock-shaft H' and stop-levers H'' H''' pivoted thereon, with the pawls $b' b''$, and the plates $c$ $c$ and pins $c'$ $c'$, with the continuously-revolving shaft G''', for the purpose of securing the alternate movements of the binder and packer mechanism, substantially as shown and described.

4. The sprocket-wheel K, its bearings located at each side thereof, and the shaft G''', passing through said bearings and carrying securely on each end thereof the plates $c$ $c$, with the clutching-pins $c'$ $c'$, for the purpose of clutching the binding and packing devices to the continuously-operating shaft G''', substantially as shown and described.

5. The combination of the sprocket-wheel I and its pin $a^3$, with the adjustable arm $a^4$ secured to the rock-shaft H', and the arm H'', for the purpose of unclutching and stopping the binder mechanism, substantially as shown and described.

6. In combination with the packer driving-shaft G', provided with the plate $b$, having the pawl $b''$, its separate driving wheel and shaft located in line therewith, and provided with the plate $c$ and its clutching-pin $c'$, with the tripping-arm H, rock-shaft H', and its stop-lever H''', for automatically unclutching and stopping the packers, substantially as shown and described.

7. The combination of the continuously-revolving shaft G''', its clutching-plate $c$ and pin $c'$, with the intermittently-revolving grain-binder-actuating shaft G'', its clutching plate and pawl $b'$, pivoted thereto, and the stop-arm H'', secured to shaft H', with its trip-arm H, for automatically clutching and starting the binder mechanism, and the wheel I, its pin $a^3$, and the arm $a^4$, secured to rock-shaft H', for unclutching and stopping the same, and simultaneously clutching and starting the packers, as shown and described.

8. The combination of the main drive-wheel, the main frame, the carrier-apron B, and the binding-table D, with the binder mechanism located at an oblique angle to the movement of the carrier-apron, to secure and bind the sheaf with the heads in advance of the butts and discharge the same in front of the main wheel, substantially as shown and described.

9. The stop-arms H'' H''' and their respective actuating-pins $i$ $i'$, secured therein, in combination with the rock-shaft H' and its trip-arm H, that the rock-shaft may be partially rotated without rocking the stop-arms, substantially as shown and described.

10. The combination of the binder-arm E, its compressor E', the cut-off finger F, and its pivot $f$, whereby the flow of grain may be temporarily checked as the binder-arm gathers the sheaf, and the pivoted rocking cut-off finger displaced and the flow resumed by the action of the binder-arm, substantially as shown and described.

CHARLES COLAHAN.

Witnesses:
R. B. MITCHELL,
W. A. WEED.